United States Patent
Montgomery

(10) Patent No.: US 11,040,690 B2
(45) Date of Patent: Jun. 22, 2021

(54) SIDE CURTAIN AIRBAG ASSEMBLY

(71) Applicant: Autoliv ASP, Inc., Ogden, UT (US)

(72) Inventor: Ryan Montgomery, Perry, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 77 days.

(21) Appl. No.: 16/530,107

(22) Filed: Aug. 2, 2019

(65) Prior Publication Data

US 2021/0031719 A1     Feb. 4, 2021

(51) Int. Cl.
| | |
|---|---|
| *B60R 21/232* | (2011.01) |
| *B60R 21/201* | (2011.01) |
| *B60R 21/213* | (2011.01) |
| *B60R 21/231* | (2011.01) |

(52) U.S. Cl.
CPC ......... *B60R 21/232* (2013.01); *B60R 21/201* (2013.01); *B60R 21/213* (2013.01); *B60R 21/23138* (2013.01)

(58) Field of Classification Search
CPC ............... B60R 21/201; B60R 21/213; B60R 21/23138; B60R 21/232
See application file for complete search history.

(56) References Cited

U.S. PATENT DOCUMENTS

| | | | | |
|---|---|---|---|---|
| 5,899,486 A | * | 5/1999 | Ibe | B60R 21/213 |
| | | | | 280/728.2 |
| 6,889,999 B2 | * | 5/2005 | Dominissini | B60R 21/201 |
| | | | | 280/730.2 |
| 7,125,037 B2 | * | 10/2006 | Tallerico | B60R 21/231 |
| | | | | 280/728.2 |
| 7,163,231 B2 | | 1/2007 | Kumagai | |
| 7,661,705 B2 | * | 2/2010 | Jacobsson | B60R 21/217 |
| | | | | 280/730.2 |
| 7,823,914 B2 | * | 11/2010 | Cheal | B60R 21/201 |
| | | | | 280/730.2 |

(Continued)

FOREIGN PATENT DOCUMENTS

| | | |
|---|---|---|
| DE | 202016004121 U1 | 10/2017 |
| EP | 2475555 B1 | 6/2014 |

OTHER PUBLICATIONS

European Patent Office, Rijswijk, Netherlands, International Search Report of International Application No. PCT/US2020/043181, dated Oct. 2, 2020, 3 pages.

*Primary Examiner* — Laura Freedman
(74) *Attorney, Agent, or Firm* — Dickinson Wright PLLC

(57) ABSTRACT

A side curtain airbag assembly includes an airbag cushion having a length and a height; a wrapper sheet having a length extending along the airbag cushion and a width perpendicular to the length; and a plurality of mounting strips distributed along the length. Each mounting strip includes a mounting bracket; a wrapping strip; and a connector strap. The wrapper sheet extends across at least two of the mounting strips and is affixed to the airbag cushion by at least one seam composed of stitches. The stitches divide the length of the wrapper sheet into a first partial width and a second partial width of the wrapper sheet. The first partial width of the wrapper sheet has a plurality of cutout openings distributed along an outer edge extending along the length of the wrapper sheet and aligned with the mounting strips. The second partial width can be free of cutout openings.

15 Claims, 2 Drawing Sheets

(56) References Cited

U.S. PATENT DOCUMENTS

| | | | |
|---|---|---|---|
| 7,980,585 B2 | 7/2011 | Cheal | |
| 8,091,918 B2* | 1/2012 | Mitchell | B60R 21/201 |
| | | | 280/728.2 |
| 8,240,701 B2 | 8/2012 | Cheal et al. | |
| 2002/0195803 A1 | 12/2002 | Terbu et al. | |
| 2005/0104335 A1 | 5/2005 | Henderson et al. | |
| 2010/0327564 A1 | 12/2010 | Cheal | |
| 2011/0042923 A1 | 2/2011 | Hatfield et al. | |
| 2015/0102588 A1* | 4/2015 | Cheal | B60R 21/201 |
| | | | 280/728.2 |
| 2018/0111579 A1 | 4/2018 | Shimizu et al. | |

\* cited by examiner

SIDE CURTAIN AIRBAG ASSEMBLY

TECHNICAL FIELD

The present disclosure relates generally to the field of automotive protective systems. More specifically, the present disclosure relates to mounting structures of side curtain airbags with wrapper sheets such as full-length wrappers.

BACKGROUND

Side-curtain airbags enhance passenger safety of vehicles, especially in crash situations, where an impact occurs in an oblique or transverse direction to the travel direction.

Side curtain airbags are typically stored above the side windows of a vehicle in a narrow space between the vehicle roof and the ceiling of the passenger compartment. A fastening arrangement for a side curtain airbag ensures a secure connection between the vehicle and the airbag, yet allows the airbag to inflate from the stored configuration to the deployed configuration. In order to avoid chafing and burring of the airbag cushion during storage and installation and to prevent rupture during deployments, wrappers are sometimes provided that enclose a partial or the entire length of the side curtain airbag to protect the outer surface of the compacted airbag cushion.

For installation, the side curtain airbag needs to be secured next to the roof rail of the vehicle with suitable fasteners attached to the airbag cushion. A wrapper typically needs to be placed accurately over the compacted airbag cushion, so the fasteners can be threaded through cutout slits in the full-length wrapper for securing the fasteners to the roof rail. Accordingly, the assembly of such a side curtain airbag with a wrapper can be labor-intense.

SUMMARY

According to the present disclosure, a side curtain airbag assembly includes an airbag cushion having a length and a height; a wrapper sheet having a length extending along the length of the airbag cushion and a width perpendicular to the length; and a plurality of mounting strips distributed along the length of the airbag cushion. Each of the mounting strips respectively includes a mounting bracket; a wrapping strip; and a connector strap connecting the mounting bracket to the airbag cushion. The wrapper sheet extends across at least two of the mounting strips and is affixed to the airbag cushion by at least one seam composed of stitches. The stitches affixing the wrapper sheet to the airbag cushion divide the length of the wrapper sheet into a first partial width and a second partial width of the wrapper sheet. The first partial width of the wrapper sheet has a plurality of cutout openings distributed along an outer edge extending along the length of the wrapper sheet. The cutout openings are aligned with the mounting strips. The second partial width can be free of cutout openings.

The first partial width is greater than the second partial width and is intended to be wrapped around the airbag cushion in a compacted state.

At least two of the connector straps may be affixed to the airbag cushion by the stitches that affix the wrapper sheet to the airbag cushion.

At least two of the wrapping strips may additionally or alternatively be affixed to the airbag cushion by the stitches that affix the wrapper sheet to the airbag cushion.

In the compacted state of the airbag cushion, the width of the wrapper sheet may be greater than the circumference of the airbag cushion so that the wrapper sheet covers the entire circumference.

The second partial width of the wrapper sheet may be smaller than the circumference of the airbag cushion in the compacted state because the second partial width lines inward from the first partial width when the side curtain airbag assembly is installed.

The first partial width of the wrapper sheet may be greater than the circumference of the airbag cushion in the compacted state, so it reaches from the stitches around the airbag and past the mounting strip.

The wrapper sheet may be a full-length wrapper extending lengthwise across all of the mounting strips of the side curtain airbag assembly.

The wrapper sheet may be made to tear under a force exerted on the wrapper sheet by a deployment of the airbag cushion to an inflated state. For example, the wrapper sheet may tear from each of the cutout openings to the outer edge extending along the length of the wrapper sheet. Alternatively or additionally, the wrapper sheet may be made to tear in the first partial width along a line parallel to the outer edge extending along the length of the wrapper sheet.

In a similar manner, the wrapping strips are made to tear under a force exerted on the wrapping strips by a deployment of the airbag cushion to an inflated state.

The connector straps, however, are made to withstand a force exerted on the connector straps by a deployment of the airbag cushion in order to keep the airbag cushion securely attached to the roof rail of the vehicle.

DETAILED DESCRIPTION OF THE DRAWINGS

The drawings are reproduced for explanatory purposes and are not drawn to scale, unless specifically stated.

Figure 1:
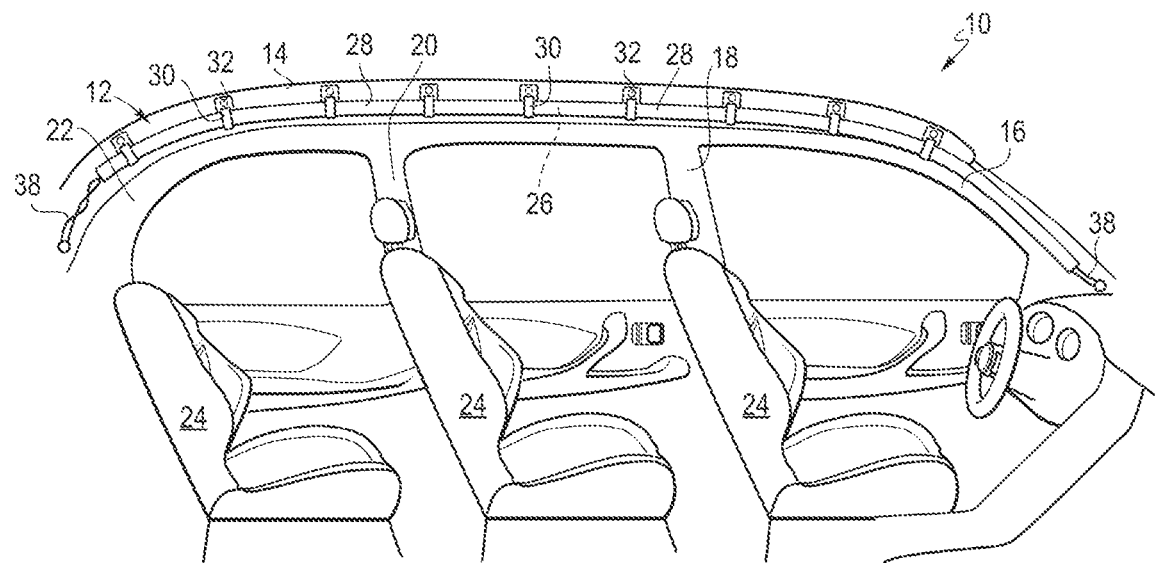
FIG. 1 shows a side curtain airbag assembly installed in a vehicle.

FIG. 1 shows the interior of a vehicle 10, where internal panels covering a side curtain airbag assembly 12 are omitted for illustrative purposes. A roof rail 14 extends from an A pillar 16 across a B pillar 18 and a C pillar 20 to a D pillar 22. The vehicle is rendered in a purely illustrative manner, and the invention is applicable to other types of vehicles, for example having fewer seating rows 24, or lacking a D pillar, or with a side curtain airbag assembly 12 only extending from the A pillar 16 past the B pillar 18.

The side curtain airbag assembly 12 has an airbag cushion 26 covered by a wrapper sheet 28 and is affixed to the roof rail 14 via mounting strips 30 permanently attached to the roof rail 14. Each of the mounting strips 30 is composed of a mounting bracket 32, a wrapping strip 34, and a connector strap 36 connecting the mounting bracket 32 to the wrapping strip 34 (shown in FIG. 3).

Tethers 38 secure the front end and the rear end of the side curtain airbag assembly 12 to the vehicle. The airbag cushion 26 deploys in a generally known manner by inflation. During deployment, the wrapping strips 34 tear, and the airbag cushion 26 extends from the roof rail 14 downward. Depending on the size and shape of the wrapper sheet 28, the wrapper sheet 28 may unroll with the airbag cushion 26 or tear like the wrapping strips 34 as will be explained in more detail below.

Figure 2:
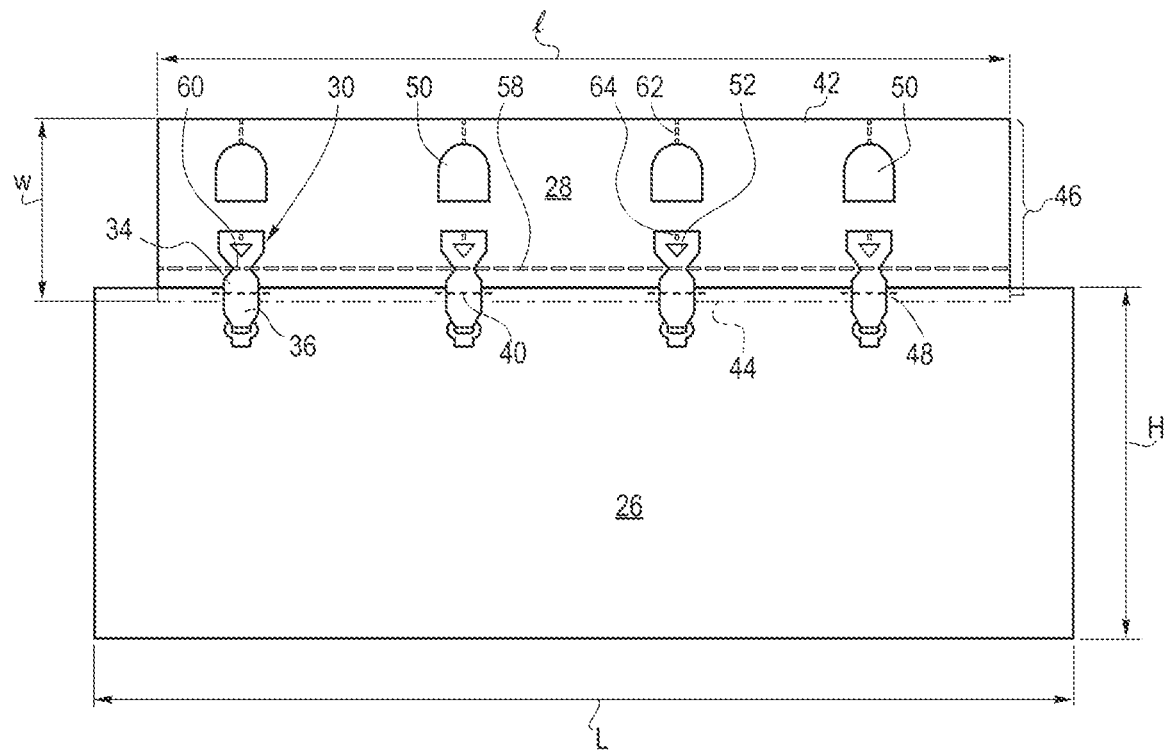
FIG. 2 shows a side curtain airbag assembly with an airbag cushion, mounting strips, and a wrapper sheet prior to compacting the airbag assembly for installation.

FIG. 2 shows a schematic plan view of an example of a side curtain airbag assembly 12 according to the present disclosure. The airbag cushion 26 is shown in a simplified manner as a plain rectangle. The outline of the airbag cushion 26 and internal compartments defined by dividing seams are omitted and depend on the interior of the respective vehicle model, in which the side curtain airbag assembly 12 is to be installed.

The airbag cushion 26 has a length L that, in the installed position shown in FIG. 1, extends along the roof rail 14 of the vehicle. Further, the airbag cushion 26 has a height H that, after deployment of the airbag cushion 26, extends downward from the roof rail 14. The wrapper sheet 28 of the example shown has a length l extending in the same direction as the length L of the airbag cushion 26.

Figure 3:
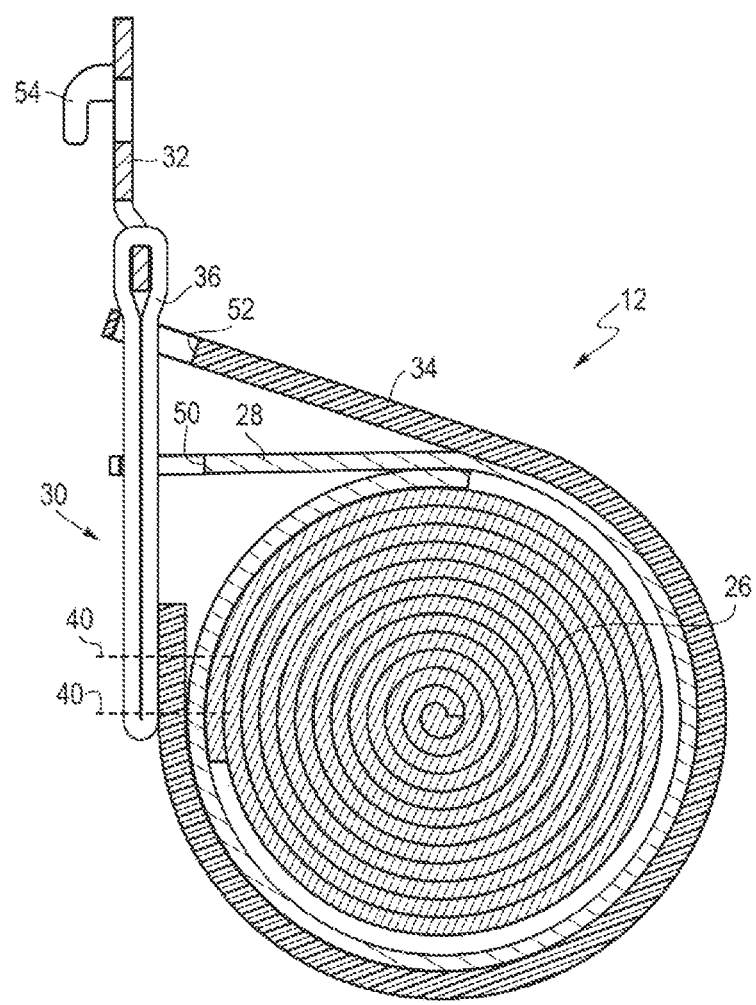
FIG. 3 shows a side curtain airbag assembly in a compacted state.

In the example shown in FIG. 2, the wrapper sheet 28 is a full-length wrapper covering the entire length L so that the lengths L and l are substantially equal. In other embodiments, two or more partial wrapper sheets 28 may be used to cover partial lengths of the airbag cushion 26. Each of the partial wrapper sheets 28 would then extend across a plurality of the mounting strips 30 in different portions of the airbag cushion 26. The partial wrapper sheets 28 may be adjacent to or overlap each other to provide a full coverage of the length L. The wrapper sheet 28 has a width w that is greater than the circumference of the airbag cushion 26 when in the compacted state shown in FIGS. 1 and 3. The compacted state may be achieved by rolling up the airbag cushion 26 as shown in FIG. 3 or by folding the airbag cushion 26.

Each of the mounting strips 30 is sewn to the airbag cushion 26 by an individual seam 40 composed of one or more rows of stitches. Each seam 40 has a dual purpose of affixing both the respective mounting strip 30 and the wrapper sheet 28 to the airbag cushion 26 so that the wrapper sheet 28 is attached to the airbag cushion 26 in several locations corresponding to the positions of the mounting strips 30. The multiple partial seams 40 or a subset of the seams 40 may be combined to a single seam extending across several of the mounting strips 30 without leaving the scope of the present disclosure.

In the example shown in FIG. 2, the individual seams 40 are placed along a line parallel to the longitudinal edges 42 and 44 of the wrapper sheet 28 and define a first partial width 46 and a second partial with 48 of the wrapper sheet 28. In FIG. 2, the seams 40 are placed close to the longitudinal edge 44, which overlaps with the airbag cushion 26. The longitudinal edge 44 may be placed at a greater distance from the seams 40 to increase the second partial width 48 as shown in FIG. 3.

In FIG. 2, the mounting strips 30 are shown in a shortened length for illustrative purposes to allow a free view of cutout openings 50 arranged along the longitudinal edge 42, which is the edge remote from the airbag cushion 26. Each of the mounting strips 30 has a respective mounting bracket 32 at one end and a loop 52 at another end. The mounting strips 30 are affixed via the seams 40 in an orientation that places the loops 52 proximate to the cutout openings 50 and the mounting brackets 32 on the end pointing toward the airbag cushion 26.

Each of the cutout openings 50 is aligned with one of the mounting strips 30, and each of the mounting strips 30 is aligned with one of the cutout openings 50. In the shown example, the cutout openings 50 are not merely slits, but have a dimension in the direction of the width w that corresponds to their dimension in the direction of the length l, for example within a deviation of +/−50% of the lengthwise dimension. The enlarged area of each cutout opening compared to mere slits provides a visual aid for locating the mounting brackets 32 of the mounting strips 30 after the airbag cushion 26 has been compacted, but before installation. The dimension of the cutout openings 50 in at least one direction, for example along the widthwise direction w may be chosen to be at least as great as the smallest dimension of the mounting bracket 32 for ease of assembly. The mounting brackets 32 can easily be threaded through the cutout openings 50 and through the loops 52 formed in the mounting strips 30.

FIG. 3 shows a schematic cross-section of the assembled side-curtain airbag assembly 12 of the present disclosure. The mounting bracket 32 of the shown example includes a projection 54 that helps position the mounting bracket 32 relative to the roof rail by cooperating with a corresponding recess in the roof rail, prior to securing the mounting bracket 32 with a fastener. The mounting bracket 32 is held by a connector strap 36 that is shown as a closed-loop band, but that may merely be a folded strap with loose ends on the side of the seam 40 remote from the mounting bracket 32.

In the shown example, the mounting strip 30, the narrow wrapping strip 34, the wide wrapper sheet 28, and the airbag cushion 26 are held together by the same seam 40, here represented by two parallel rows of stitches. Alternatively, different rows of stitched may connect different elements of the side curtain airbag assembly 12 to one another. For example, the wrapper sheet 28 and the connector strap 36 may be joined to the airbag by one row of stitches, and the wrapping strip 34 may be attached to the connector strap 36 by a different row of stitches.

Notably, both the wrapper sheet 28 and the wrapping strip 34 will tear away during deployment, but the connector strap 36 remains intact to retain the airbag cushion 26 during deployment. Accordingly, at least one of the seams 40 connects the connector strap 36 to the airbag cushion 26, while the wrapping strip 34 or the wrapper sheet 28 or both may be merely stitched to the connector strap 36 and not to the airbag cushion 26, without detriment to the function of the side curtain airbag assembly 12.

FIG. 2 shows lines 58, 60, 62, and 64 of weakened that indicate intentional tear lines, along which the wrapping strips 34 and the wrapper sheet 28 may tear when the airbag cushion 26 is deployed. Tear lines 58 and 60 are disposed in a longitudinal direction in the wrapper sheet 28 and the wrapping strips 34, respectively.

Alternatively or additionally, widthwise tear lines 62 and 64 are placed at the periphery of the cutout openings 50 of the wrapper sheet 28 and of the loops 52 formed by the wrapping strips 34. For example, each of the wrapping strips 34 may have only one of the tear lines 60 and 64. Likewise, the wrapper sheet 28 may only have tear lines 62 at each cutout opening or the longitudinal tear line 58. Furthermore, the wrapper sheet 28 or the wrapping strips 34 may have such a structure that the material rips under the force of the airbag cushion 26 deployment at the loops 52 and at the cutout openings 50 without any local weakening of the material of the wrapping strips 34 or the wrapper sheet 28.

FIG. 3 is a schematic cross-sectional depiction of the compacted state of the side curtain airbag assembly 12. In FIG. 3, the airbag cushion 26 is rolled up by a conventional rolling method, commonly called Uni-roller method. The attached wrapper sheet 28 extending around the airbag cushion 26 is rolled up along with the airbag cushion 26 without requiring additional wrapping steps. After the rolling process, the mounting bracket 32 is pulled through the cutout opening of the wrapper sheet 28 and the loop 52 of the wrapping strip 34.

While the airbag cushion 26 of FIG. 3 is rolled, the present disclosure is also applicable to compacted states, in which the airbag cushion 26 is folded. During the folding process, the wrapper sheet 28 may have to be prevented from being folded into the airbag cushion 26 and can then be wrapped around the folded airbag cushion 26.

FIG. 3 shows the mounting buckle held by the connecting strap. The connecting strap, the wrapping strip 34, and the wrapper sheet 28 are all sewn onto the airbag cushion 26.

As explained above, only the connecting strap needs to be securely attached to the airbag cushion 26. The wrapping strip 34 and the wrapper sheet 28 only need to be connected to the airbag cushion 26 in a manner that properly positions the wrapping strip 34 and the wrapper sheet 28 relative to the airbag cushion 26, but the connection, which may be direct or indirect via the connector strap 36, does not need to withstand any major forces, such as the force resulting from deploying the airbag cushion 26.

In FIG. 3, the second partial width 48 of the wrapper sheet 28 appears to be fairly wide to create a clear overlap with the first partial width 46. The reproduction of FIG. 3 is not to scale. For ease of rolling up the airbag cushion 26 without interference by the second partial width 48 of the wrapper sheet 28, however, the second partial width 48 may be narrower than shown and end close to the seam 40. In the installed state, both the loop 52 of the wrapping strip 34 and the cutout opening 50 of the wrapper sheet 28 will lie close to the circumference of the compacted airbag cushion 26 so that the wrapper sheet 28 will cover the entire circumference even if the second partial width 48 is fairly short. Accordingly, the wrapper sheet 28 will preferably have a total width w greater than the circumference of the compacted airbag cushion 26.

In particular, the first partial width 46 may be equal to or greater than the circumference of the compacted airbag cushion 26, while the second partial width 48 may be shorter than the circumference of the compacted airbag cushion 26. This is mostly applicable to rolled airbag cushions 26. Where the airbag cushion 26 is folded, the partial widths 46 and 48 are more variable because the attached wrapper sheet 28 may be wrapped around the compacted airbag cushion 26 after folding.

While the above description constitutes the preferred embodiments of the present invention, it will be appreciated that the invention is susceptible to modification, variation and change without departing from the proper scope and fair meaning of the accompanying claims.

What is claimed is:

1. A side curtain airbag assembly comprising:
   an airbag cushion having a length along a vehicle direction and a height;
   a wrapper sheet having a length extending along the length of the airbag cushion and a width perpendicular to the length; and
   a plurality of mounting strips distributed along the length of the airbag cushion, each of the mounting strips respectively including:
      a mounting bracket;
      a wrapping strip; and
      a connector strap connecting the mounting bracket to the wrapping strip;
   wherein the wrapper sheet extends across at least two of the mounting strips and is affixed to the airbag cushion by stitches; and
   wherein the stitches affixing the wrapper sheet to the airbag cushion divide the length of the wrapper sheet into a first partial width and a second partial width of the wrapper sheet, wherein in the first partial width, the wrapper sheet has a plurality of cutout openings distributed along an outer edge extending along the length of the wrapper sheet, the plurality of cutout openings being aligned with the plurality of mounting strips.

2. The side curtain airbag assembly of claim 1, wherein each of the cutout openings has an opening dimension perpendicular to the length of the airbag cushion that is within +/−50% of an opening dimension parallel to the length of the airbag cushion.

3. The side curtain airbag assembly of claim 1, wherein the second partial width is free of cutout openings.

4. The side curtain airbag assembly of claim 1, wherein the first partial width is greater than the second partial width.

5. The side curtain airbag assembly of claim 1, wherein at least two of the connector straps are affixed to the airbag cushion by the stitches that affix the wrapper sheet to the airbag cushion.

6. The side curtain airbag assembly of claim 1, wherein at least two of the wrapping strips are affixed to the airbag cushion by the stitches that affix the wrapper sheet to the airbag cushion.

7. The side curtain airbag assembly of claim 1, wherein the airbag cushion has a compacted state having the length of the airbag cushion and a circumference and wherein the width of the wrapper sheet is greater than the circumference of the airbag cushion in the compacted state.

8. The side curtain airbag assembly of claim 7, wherein the second partial width of the wrapper sheet is smaller than the circumference of the airbag cushion in the compacted state.

9. The side curtain airbag assembly of claim 7, wherein the first partial width of the wrapper sheet is greater than the circumference of the airbag cushion in the compacted state.

10. The side curtain airbag assembly of claim 1, wherein the wrapper sheet is a full-length wrapper extending lengthwise across all of the mounting strips of the side curtain airbag assembly.

11. The side curtain airbag assembly of claim 1, wherein the side curtain airbag assembly has an installation state, in which the airbag cushion is in a compacted state and the wrapper sheet is wrapped around the airbag cushion, wherein the wrapper sheet is made to tear under a force exerted on the wrapper sheet by a deployment of the airbag cushion to an inflated state.

12. The side curtain airbag assembly of claim 11, wherein the wrapper sheet is made to tear from each of the cutout openings to the outer edge extending along the length of the wrapper sheet.

13. The side curtain airbag assembly of claim 11, wherein the wrapper sheet is made to tear in the first partial width along a line parallel to the outer edge extending along the length of the wrapper sheet.

14. The side curtain airbag assembly of claim 1, wherein the side curtain airbag assembly has an installation state, in which the airbag cushion is in a compacted state and the wrapping strips are wrapped around the airbag cushion, wherein the wrapping strips are made to tear under a force exerted on the wrapping strips by a deployment of the airbag cushion to an inflated state.

15. The side curtain airbag assembly of claim 1, wherein the connector straps are made to withstand a force exerted on the connector straps by a deployment of the airbag cushion to an inflated state.

* * * * *